US009928362B2

(12) United States Patent
Singh et al.

(10) Patent No.: US 9,928,362 B2
(45) Date of Patent: Mar. 27, 2018

(54) DYNAMIC CHANGING OF ACCESS TOKEN TYPES

(71) Applicant: HONEYWELL INTERNATIONAL INC., Morristown, NJ (US)

(72) Inventors: Praveen Kumar Singh, Karnataka (IN); Rod Stein, Edmonton (CA)

(73) Assignee: Honeywell International Inc., Morristown, NJ (US)

( * ) Notice: Subject to any disclaimer, the term of this patent is extended or adjusted under 35 U.S.C. 154(b) by 552 days.

(21) Appl. No.: 14/273,225

(22) Filed: May 8, 2014

(65) Prior Publication Data

US 2015/0324577 A1 Nov. 12, 2015

(51) Int. Cl.
| | |
|---|---|
| G06F 21/00 | (2013.01) |
| G06F 21/45 | (2013.01) |
| H04L 29/06 | (2006.01) |
| G06F 21/31 | (2013.01) |
| G06F 9/54 | (2006.01) |
| H04L 29/08 | (2006.01) |
| H04L 29/14 | (2006.01) |

(Continued)

(52) U.S. Cl.
CPC ............... *G06F 21/45* (2013.01); *G06F 9/54* (2013.01); *G06F 21/31* (2013.01); *G06F 21/335* (2013.01); *G06F 21/6236* (2013.01); *H04L 63/083* (2013.01); *H04L 63/0807* (2013.01); *H04L 67/141* (2013.01); *H04L 69/40* (2013.01); *H04L 63/0281* (2013.01); *H04L 67/12* (2013.01); *H04L 67/2876* (2013.01)

(58) Field of Classification Search
CPC . G06F 21/45; G06F 9/54; G06F 21/31; G06F 21/6236; G06F 21/335; H04L 67/14; H04L 63/083; H04L 63/0807; H04L 67/141; H04L 69/40; H04L 63/0281; H04L 67/12; H04L 67/2876
See application file for complete search history.

(56) References Cited

U.S. PATENT DOCUMENTS

| | | | |
|---|---|---|---|
| 7,334,126 B1 * | 2/2008 | Gilmore | H04L 63/0281 707/999.001 |
| 2005/0091213 A1 * | 4/2005 | Schutz | G06F 21/32 |

(Continued)

OTHER PUBLICATIONS

Definition of "proxy server", Wikipedia, Oct. 31, 2014, pp. 1-12.

*Primary Examiner* — Kendall Dolly
(74) *Attorney, Agent, or Firm* — Jetter & Associates, P.A.

(57) ABSTRACT

A system, method and computer program product for dynamically changing access tokens in a communication system. A client computer system is communicatively coupled by a communication channel to at least one target server. The client computer system includes a processor connected to a storage device that has a non-transitory machine-readable storage medium. The storage device stores a connection failure recovery program. The client computer system is programmed to implement the connection failure recovery program. The client computer system initiates a session by transmitting a first request for a connection to the target server using a first token type such as a client security token and if the first request fails, transmits a second request for a connection to the target server using a different token type.

20 Claims, 4 Drawing Sheets

(51) Int. Cl.
  *G06F 21/33*  (2013.01)
  *G06F 21/62*  (2013.01)

(56) References Cited

U.S. PATENT DOCUMENTS

| | | | | |
|---|---|---|---|---|
| 2008/0307219 | A1* | 12/2008 | Karandikar | H04L 63/166 |
| | | | | 713/153 |
| 2009/0271854 | A1* | 10/2009 | Hazlehurst | G06F 21/41 |
| | | | | 726/7 |
| 2010/0318665 | A1* | 12/2010 | Demmer | H04L 41/12 |
| | | | | 709/227 |
| 2011/0321147 | A1* | 12/2011 | Chakra | G06F 21/6218 |
| | | | | 726/9 |
| 2014/0330891 | A1* | 11/2014 | Basha P.R. | H04L 63/0428 |
| | | | | 709/203 |

* cited by examiner

DYNAMIC CHANGING OF ACCESS TOKEN TYPES

FIELD

Disclosed embodiments relate to computers used with industrial hardware devices and more specifically relate to dynamically changing access tokens for accessing target server(s) in a computer network.

BACKGROUND

Open Process Control (OPC) is a software interface standard that allows WINDOWS programs run on computers to communicate with industrial hardware devices used in manufacturing plants and refineries. The acronym OPC comes from OLE (Object Linking and Embedding for Process Control). OLE is partially based on the WINDOWS component object model (COM) standard and OPC shares some common features with COM. OPC is implemented over a client/server network.

The OPC server contains a software program that converts the hardware communication protocols used by industrial hardware devices such as programmable logic controllers (PLC) into the OPC protocol. The OPC client software includes programs to connect to the industrial hardware devices such as a human-machine interface. The OPC client uses the OPC server to receive data and/or transmit commands to the industrial hardware devices.

The OPC client connects to one or more servers using a token. The token includes client credential information that is validated by the server to decide whether to allow or prevent access to the server. The proxy connection and the server are not always in the same domain so that the client's token credentials may not be understood which can result in a connection failure. In another case, the server may not support the specific token being used which also results in a connection failure.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include a system for dynamically changing access tokens in a communication system. A client computer system is communicatively coupled by a communication channel to at least one target server. The client computer system includes a processor connected to a storage device that has a non-transitory machine-readable storage medium. The storage device stores a connection failure recovery program (or algorithm). The client computer system is programmed to implement the connection failure recovery program. The client computer system initiates a session by transmitting a first request for a connection to the target server using a first token type (e.g., a client security token) and if the first request fails, transmits a second request for a connection to the target server using a different token type. The order in which the failure recover program logic used by the client computer system selects from the different token types can be in various orders, and can also be subject to being changed.

One disclosed embodiment comprises a method for dynamically changing access token types in a communication system. The method includes providing a client computer system including non-transitory machine-readable storage. The client computer system includes at least one processor that is communicatively coupled by a communication channel including at least one proxy connection to at least one target server. An algorithm for dynamically changing access token types is stored in the machine-readable storage. The algorithm is implemented by the processor causing the client computer system to execute initiating a session by transmitting a first request for a connection to the target server using a first token type (e.g., a client security token) and if the first request fails, transmitting a second request for a connection to the target server using a different token type.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments provide a method, system and computer program product for dynamically changing access token types in a communication system. In accordance with a disclosed embodiment, a client computer system is coupled by a communication channel to at least one target server. The client computer system includes a processor connected to a storage device having a non-transitory machine-readable storage medium. The storage device stores a connection failure recovery program. The client computer system is programmed to implement a connection failure recovery program. The client computer system initiates a session by transmitting a first request for a connection to the target server using a first token type (e.g., a client security token) and if the first request fails, transmits a second request for a connection to the target server using a different token type. As used herein, a client security token (also known in the art as a client authorization token)

contains information about the User's credentials whose account permissions are used to make that particular call. The target server validates this token and only if it is correct establishes a session with the client computer system.

Figure 1:
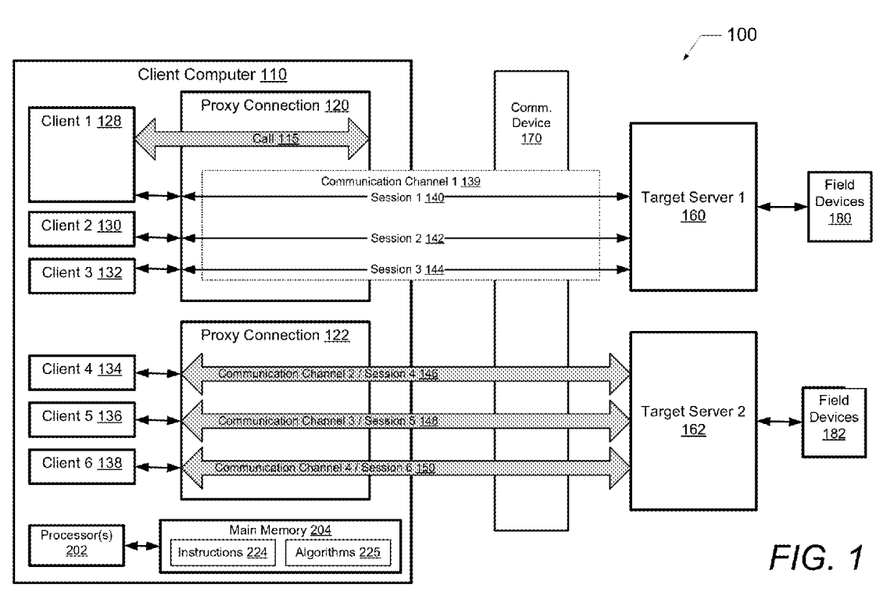
FIG. 1 is a block diagram of an example communication system, according to an example embodiment.

FIG. 1 illustrates a block diagram of an example communication system 100. As shown in FIG. 1, communication system 100 comprises a client computer system 110 that is in communication with one or more target servers shown as target server 1 160 and target server 2 162 (collectively hereafter target servers 160 and 162) via a communication device 170. The client computer system 110 can be connected or networked to other target servers. In one embodiment, client computer system 110 is an Open Process Control (OPC) enabled computer that is running an OPC program. In a networked deployment, client computer system 110 can operate in the capacity of a client machine in a client-server network environment. In one embodiment, client computer system 110 is a non-embedded platform. In another embodiment, client computer system 110 is implemented as an embedded platform.

Client computer system 110 includes one or more processors 202 such as a central processing unit (CPU) and a main memory 204, which communicate with each other via a bus. Main memory 204 can store instructions 224 and/or algorithms 225 for execution by processor 202. Each target server 1 160 and target server 2 162 is also a computer system. Communication device 170 can be selected from a wide variety of communication devices such as devices having a direct link over a serial or parallel communications bus, a wireless connection, an internet connection, a wide area network connection or a remote link through one or more switches and/or routers.

Client computer system 110 further includes several clients including client 1 128, client 2, 130, client 3, 132, client 4 134, client 5 136 and client 6, 138 (collectively hereafter clients 128-138). Clients 128-138 access and exchange information with target servers 160 and 162. Proxy connections 120 and 122 act as intermediaries for requests from clients 128-132 and 134-136, respectively, seeking resources from target servers. While two proxy connections 120, 122 are shown in FIG. 1, the client computer system 110 can include tens or hundreds of proxy connections. The proxy connections 120 and 122 evaluate requests for service from clients as a way to simplify and control complexity within the communication system 100. One such request for service is a request for a connection or call 115.

An incoming call 115 from client 1 128 is shown in FIG. 1 coming into the Proxy connection 120 and in response to that an outgoing call Channel1\Session is originated from Proxy process to target server 1 160. Proxy connection 120 is shown having a communication channel 1 139 with several sessions simultaneously running including session 1 140, session 2 142 and session 3 144. Communication channel 1/session 1 140 communicatively couples client 1 128 to target server 1 160. In one embodiment, communication channel 1/session 1 140 can transmit call 115 from client 1 128 to target server 1 160. Communication channel 1/session 2 142 communicatively couples client 2 130 to target server 1 160. Communication channel 1/session 3 144 communicatively couples client 3 132 to target server 1 160.

While three sessions are shown in proxy connection 120, the proxy connections 120 and 122 can each include hundreds of sessions. Similarly, proxy connection 122 has several communication channels including communication channel 2/session 4 146, communication channel 3/session 5 148 and communication channel 4/session 6 150. Communication channel 2/session 4 146 communicatively couples client 4 134 to target server 2 162. Communication channel 3/session 5 148 communicatively couples client 5 136 to target server 2 162. Communication channel 4/session 6 150 communicatively couples client 6 138 to target server 2 162.

Significantly, as shown in FIG. 1, target server 1 160 is in communication with field devices 180 and target server 2 162 is in communication with field devices 182. The field devices 180 and 182 shown in FIG. 1 are typically provided in large number in a processing plant and include sensors for sensing physical measurements for a process being run (e.g., pressure, temperature, level, or fluid flow) and instruments performing control output actions (e.g., control valves, actuators, or drive units) for a plurality of processing units (not shown) in the processing plant (e.g., an industrial plant or refinery). Field devices 180 can exchange process data and other information with target server 1 160 and field devices 182 can exchange process data and other information with target server 2 162.

Figure 2:
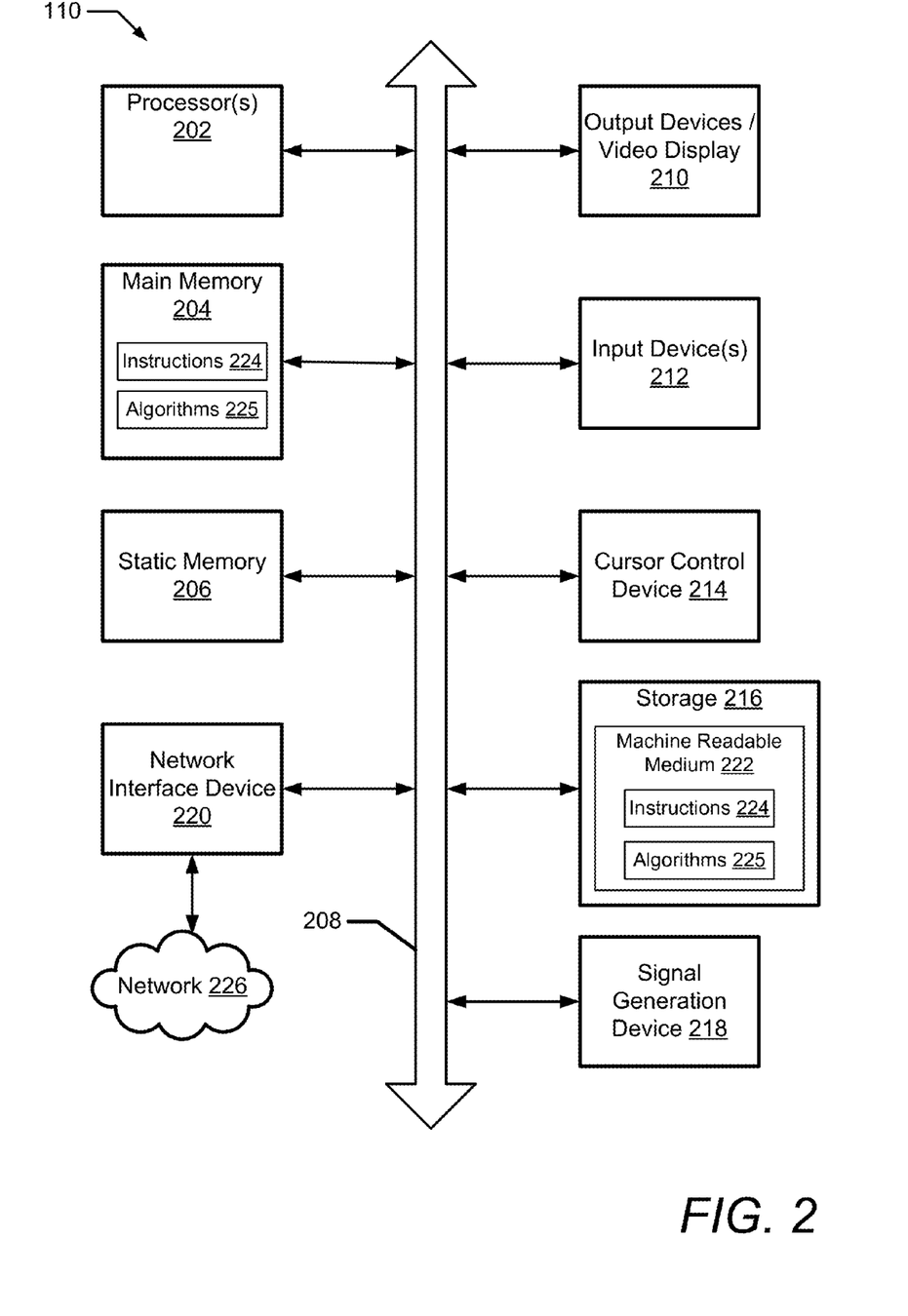
FIG. 2 is a block diagram of an example client computer system, according to an example embodiment.

FIG. 2 illustrates an example block diagram of client computer system 110 within which a set of instructions 224 and/or algorithms 225 can be executed causing the client computer system 110 to perform any one or more of the methods, processes, operations, applications, or methodologies discussed herein. Client computer system 110 includes one or more processors 202 such as a central processing unit (CPU), a graphics processing unit (GPU) or both, a main memory 204 and a static memory 206, which communicate with each other via a system bus 208 which can represent a data bus and an address bus. Main memory 204 can store instructions 224 and/or algorithms 225 for execution by processor 202. The client computer system 110 further includes output devices such as a video display unit 210 (shown in FIG. 2 as Output Devices/Video Display 210) and a signal generation device 218 (e.g., a speaker) which are connected to system bus 208. The client computer system 110 also has input devices such as an alphanumeric input device 212 (e.g., a keyboard) and a cursor control device 214 (e.g., a mouse) that are connected to system bus 208. A network interface device 220 is shown connected to an external communication network 226 to enable communication with the system bus 208.

A storage device 216 (shown as storage 216 in FIG. 2) such as a hard drive or solid state drive is connected to and in communication with system bus 208. The storage device 216 includes a machine-readable medium 222 on which is stored one or more sets of software such as instructions 224 and/or algorithms 225 embodying any one or more of the methodologies or functions described herein. The instructions 224 and/or algorithms 225 can also reside, completely or at least partially, within the main memory 204 and/or within the processor 202 during execution thereof by the client computer system 110. The main memory 204 and the processor 202 also containing machine-readable media. The instructions 224 and/or algorithms 225 can further be transmitted or received over network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the computer system and that cause the computer system to perform any one or more of the methodologies shown in the various embodiments of the present invention. The term "machine-readable medium" shall accordingly be taken to include, but not be limited to, solid-state memories, optical and magnetic media, and carrier wave signals.

Figure 3:
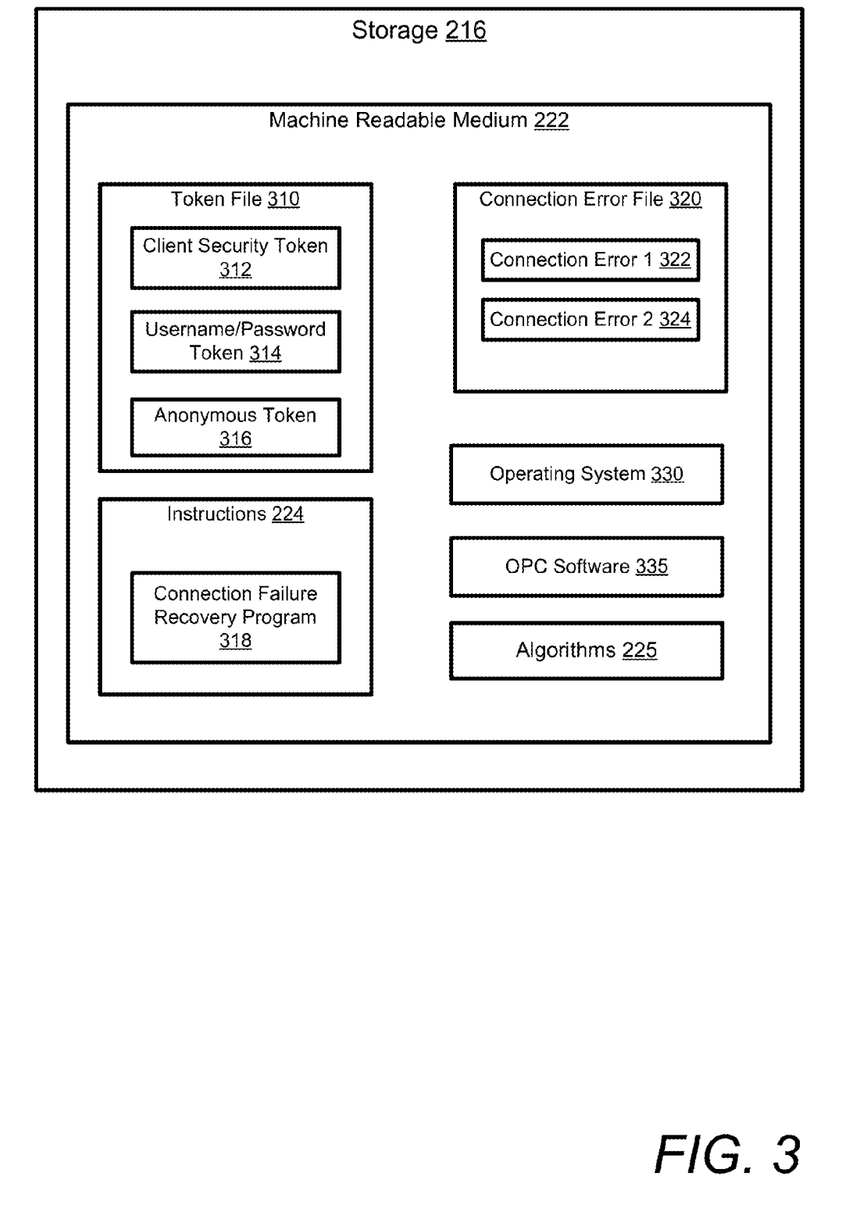
FIG. 3 is an example illustration of contents of a computer readable storage medium, according to an example embodiment.

With reference to FIG. 3, example contents of machine-readable medium 222 stored within storage device 216 are shown. Machine-readable medium 222 can store instructions 224 and/or algorithms 225 for execution by processor 202. Instructions 224 can include a connection failure recovery program 318 that when executed by processor 202 dynamically changes access token types that are transmitted in a call from proxy connections 120, 122 to target servers 160 and 162. An operating system (O/S) 330 and OPC software 335 are also stored in machine-readable medium 222. Operating system (O/S) 330 manages resources and provides common services for client computer system 110. The OPC software 335 enables communication with the hardware communication protocols used by industrial hardware devices such as programmable logic controllers (PLCs).

Machine-readable medium 222 further can store one or more access token files 310 and one or more connection error log files 320. Access token file 310 stores one or more different access token types including one or more first token types shown as a client security token 312, one or more second token types shown as username/password token 314 and one or more third token types shown as an anonymous token 316. As noted above, the order in which the fail recover logic used by the client computer system selects from the different token types can be in various orders, and can be subject to change. The access token is an object that includes the security identity of a process or thread.

A token is used to make security decisions and to store tamper-proof security information about a system entity. An access token is used by the operating system when a process or thread interacts with objects that have security descriptors. Connection error log file 320 stores one or more connection errors such as connection error 1 322 and connection error 2 324. A connection error is generated for each connection request failure that occurs. Connection error log file 320 contains information that allows a user to determine which access token types have succeeded in establishing a connection and which access token types have failed to establish a connection. When a request for a connection to the target server is denied, the connecting error log allows a user to view the access token types used and to confirm the use of an improper access token type.

Figure 4:
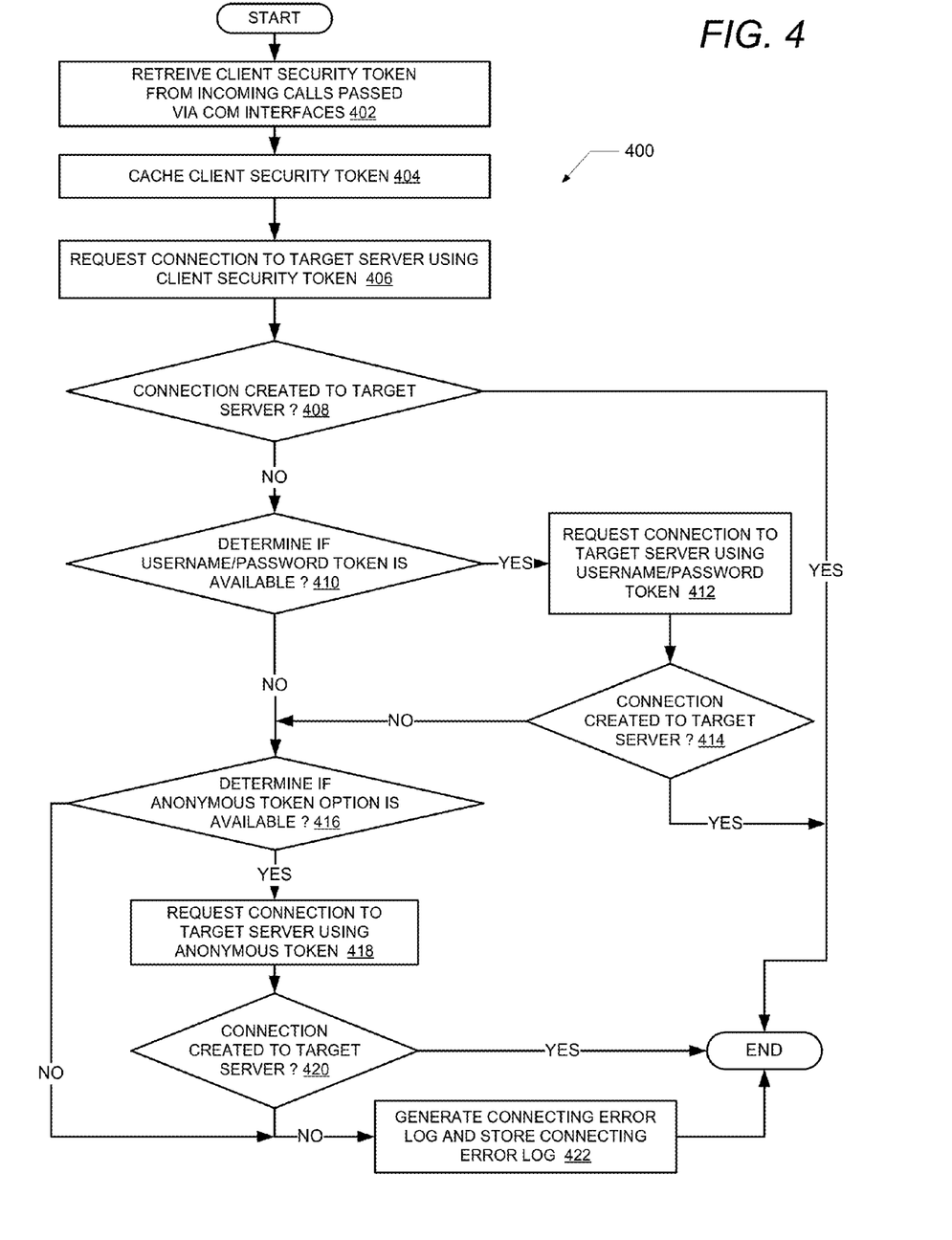
FIG. 4 is a flow chart that shows steps in an example method of dynamically changing access token types, according to an example embodiment.

FIG. 4 is a flow chart showing steps in an example method 400 for dynamically changing access token types in a communication system, according to an example embodiment. With reference to FIGS. 1-4, method 400 can be implemented via the execution of instructions 224 and/or algorithms 225 by processor 202 within the client computer system 110 and more specifically by the execution of the connection failure recovery program 318 by processor 202. Method 400 begins at the start block and proceeds to block 402. At block 402, processor 202 retrieves a client security token 312 from an incoming OPC call 115 (request for connection) that is passed via one or more COM interfaces within the proxy connection (i.e. proxy connection 120 or 122). Processor 202 caches or stores the first token type shown as a client security token 312 to access token file 310 at block 404.

At block 406, processor 202, initiates a session (i.e. session 1 140) by transmitting a request for a connection via communication device 170 to one or more of the target servers (i.e. target server 1 120) using the client security token 312. Processor 202 determines if the connection has been successfully established to the target server, using the client security token 312, at decision block 408. In response to the connection being successfully established to the target server, method 400 ends. In response to the connection not being successfully established to the target server, processor 202 determines if a second token type shown as a username/password token 314 is available at decision block 410. In one embodiment, the username/password token 314 is passed along with the outgoing session activation call 115. In another embodiment, the username/password token 314 is pre-determined and stored in access token file 310.

In response to the username/password token 314 being available, processor 202 initiates a session (i.e. session 1 140) by transmitting a request for a connection via communication device 170 to one or more of the target servers (i.e. target server 1 120) using the username/password token 314 at block 412. Processor 202 determines if the connection has been successfully established to the target server, using a second token type shown as a username/password token 314, at decision block 414. In response to the connection being successfully established to the target server using the username/pas sword token 314, method 400 terminates. In response to either the username/password token 314 not being available or the connection not being successfully established to the target server using the username/password token 314, processor 202 determines if a third token type shown as an anonymous token 316 is available at decision block 416. In one embodiment, the anonymous token 316 is passed along with the outgoing session activation call 115. In another embodiment, the anonymous token 316 is pre-determined and stored in the access token file 310.

In response to the anonymous token 316 being available, processor 202 initiates a session (i.e. session 1 140) by transmitting a request for a connection via communication device 170 to one or more of the target servers (i.e. target server 1 120) using the anonymous token 316 at block 418. Processor 202 determines if the connection has been successfully established to the target server, using the anonymous token 316, at decision block 420. In response to the connection being successfully established to the target server using the anonymous token 316, method 400 terminates. In response to either the anonymous token 316 not being available or the connection not being successfully established to the target server using the anonymous token 316, processor 202 generates a connection error log file 320 and stores the connection error log file 320 to machine-readable medium 222. Method 400 then ends.

Method 400 allows for dynamically changing access token types in a communication system 100. By determining the available access token types and requesting a connection to a target server using the available access token types, method 400 provides a higher probability of success in establishing a connection between a client computer system and a target server. By using the available access token types such as client security token 312, username/password token 314, and anonymous token 316, connection failure recovery program 318 can change the access token type used to connect to the target server and attempt to connect to the target server using a different access token type than the initial access token type used.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method, comprising:
providing a communication system including a client computer system having non-transitory machine-readable storage, the client computer system including at least one processor communicatively coupled by a communication channel including at least one proxy connection to at least one target server, wherein an algorithm for dynamically changing access token types is stored along with a token file including a plurality of different token types including a first token type and at least one different token type in said machine-readable storage, said algorithm implemented by said processor causing said client computer system to execute:
initiating a session by transmitting a first request for a first connection to said target server using said first token type;
if said first request fails, automatically transmitting a second request for a second connection to said target server using said different token type,
following said target server identifying a valid token by validating said first token type if said first request is found to be correct or when said first request fails validating said different token type without requiring user interaction to provide said different token type if said second request is found to be correct, said client computer system building a session using said valid token involving access to said target server on said communication channel, and
responsive to said building said session, said client computer system communicating with said target server using said valid token.

2. The method of claim 1, wherein said first token type comprises a client security token and said different token type comprises a username and password token.

3. The method of claim 1, wherein if said second request fails, transmitting a third request for a connection to said target server using another different token type.

4. The method of claim 3, wherein said another different token type comprises an anonymous user token.

5. The method of claim 3, further comprising:
if said third request for a connection fails, terminating said session, and generating a connecting error log and storing said connecting error log to said machine-readable storage.

6. The method of claim 1, wherein said client computer system comprises an embedded platform.

7. The method of claim 1, wherein said client computer system comprises a non-embedded platform.

8. The method of claim 1, wherein said communication system is an Ethernet network, and wherein said target server controls at least one field device in communication with said target server.

9. A system for dynamically changing access tokens in a communication system comprising:
a client computer system communicatively coupled by a communication channel to at least one target server; said client computer system including a processor connected to a storage device having a non-transitory machine-readable storage medium; wherein said storage device stores a connection failure recovery program for dynamically changing access token types using a stored token file including a plurality of different token types including a first token type and at least one different token type and wherein said client computer system is programmed to implement said connection failure recovery program, wherein said client computer system:
initiates a session by transmitting a first request for a first connection to said target server using said first token type, and
if said first request fails, automatically transmits a second request for a second connection to said target server using said different token type,
following said target server identifying a valid token by validating said first token type if said first request is found to be correct or when said first request fails validating said different token type without requiring user interaction to provide said different token type if said second request is found to be correct, said client computer system for building a session using said valid token involving access to said target server on said communication channel, and
responsive to said building said session, said client computer system for communicating with said target server using said valid token.

10. The system of claim 9, wherein said first token type comprises a client security token and said different token type comprises a username and password token.

11. The system of claim 9, wherein if said second request fails, said client computer system transmits a third request for a connection to said target server using another different token type.

12. The system of claim 11, wherein said another different token type comprises an anonymous user token.

13. The system of claim 11, wherein if said third request for a connection fails, said client computer system terminates said session, and generates a connecting error log and stores said connecting error log to said machine-readable storage.

14. The system of claim 9, wherein said client computer system comprises an embedded platform.

15. The system of claim 9, wherein said client computer system comprises a non-embedded platform.

16. The system of claim 9, wherein said communication system is an Ethernet network, and wherein said target server controls at least one field device in communication with said target server.

17. A computer program product, comprising:

a non-transitory data storage medium that includes program instructions that when executed by a processor, enable said processor using a stored token file including a plurality of different token types including a first token type and at least one different token type to execute a method of dynamically changing access tokens in a communication system, said communication system including a client computer system communicatively coupled by a communication channel to at least one target server, said computer program product comprising:

code for initiating a session by transmitting a first request for a first connection to said target server using said first token type, and if said first request fails, code for automatically transmitting a second request for a second connection to said target server using said different token type, following said target server identifying a valid token by validating said first token type without requiring user interaction to provide said different token type if said first request is found to be correct or when said first request fails validating said different token type if said second request is found to be correct, said client computer system building a session using said valid token involving access to said target server on said communication channel, and responsive to said building said session, said client computer system communicating with said target server using said valid token.

18. The computer program product of claim 17, wherein said first token type comprises a client security token and said different token type comprises a username and password token.

19. The computer program product of claim 17, wherein if said second request fails, code for transmitting a third request for a connection to said target server using another different token type.

20. The computer program product of claim 19, wherein said another different token type comprises an anonymous user token.

\* \* \* \* \*